Aug. 5, 1958  K. T. KSIESKI  2,845,937
AIRCRAFT TANK VENT VALVE

Filed Dec. 1, 1953  10 Sheets-Sheet 1

INVENTOR
K.T. Ksieski
BY Kimmel & Crowell
ATTORNEYS

Aug. 5, 1958  K. T. KSIESKI  2,845,937
AIRCRAFT TANK VENT VALVE
Filed Dec. 1, 1953  10 Sheets-Sheet 3

INVENTOR
K.T.Ksieski
BY Kimmel & Crowell
ATTORNEYS

Aug. 5, 1958 K. T. KSIESKI 2,845,937
AIRCRAFT TANK VENT VALVE
Filed Dec. 1, 1953 10 Sheets-Sheet 4

INVENTOR
K.T. Ksieski
BY Kimmel & Crowell
ATTORNEYS

United States Patent Office 2,845,937
Patented Aug. 5, 1958

2,845,937
AIRCRAFT TANK VENT VALVE

Kazimierz Theophil Ksieski, Corry, Pa., assignor to Aero Supply Mfg. Co., Inc., Corry, Pa., a corporation of New York Application December 1, 1953, Serial No. 395,406
4 Claims. (Cl. 137—38)

This invention relates to improvements in the venting system of aircraft tanks, particularly of fuel tanks. Its object is to prevent fuel from entering the vent pipes during maneuvers of the aircraft in flight and on the ground.

The range of the aircraft is limited by the amount of fuel which the aircraft can carry. For the modern aircraft the problem of finding enough space for fuel is a particularly difficult one. This is due to two conflicting requirements, the first, to build the aircraft as small and compact as possible for an assumed weight in order to obtain the best performance, and secondly, to carry as much fuel as possible to cater to the enormous consumption of jet engines.

Among the few locations left on the aircraft for the installation of fuel tanks, the wings offer attractive possibilities, due to their favorable location with respect to the center of gravity of the aircraft and since they are relatively free of equipment. Unfortunately, the shape of a tank squeezed into a thin wing and often extending over a considerable distance spanwise is far from satisfactory and presents a number of operational difficulties. Due to the extremely flat shape of the wing tanks, the inlets of vent pipes are located close to the level of fuel when the tanks are full. Because of positive diehedral in most of aircraft, the inlets of vent pipes are situated at the outboard ends of tanks in the direction of action of centrifugal forces. At certain maneuvers of the aircraft, like roll or spin and even at gentle turns during taxiing or turning of the aircraft on the ground, large quantities of fuel move toward the inlets of vent pipes and flood the pipes.

Although by a proper layout of the vent system, it is possible to prevent fuel from spilling in very large quantities through the vent pipes at any flight attitude of the aircraft, the slugs of fuel which fill the pipes repeatedly, and which, in case of modern aircraft provided with large vent pipes are quite substantial, almost inevitably drain outside. The spilled fuel damages the macadam surface on ramps and runways and constitutes a considerable fire hazard. It is particularly objectionable on aircraft carriers.

Figures 1, 2:
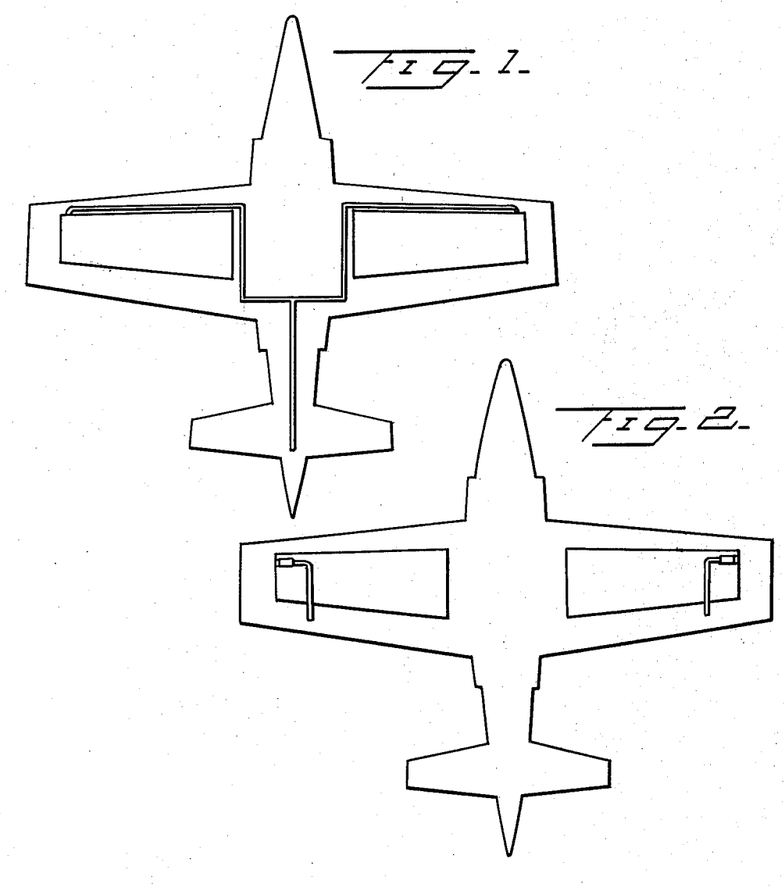
Figure 1 is a diagrammatic view of a conventional aircraft vent system which prevents large quantities of fuel being spilled at any flight attitude of the aircraft.
Figure 2 is a diagrammatic view of an aircraft vent system the piping of which has been considerably reduced due to the incorporation of vent valves of this invention.
Figure 3:
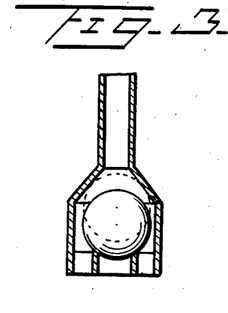
Figure 3 through Figure 7 illustrate different alternatives of float operated vent valves.
Figures 4, 5:
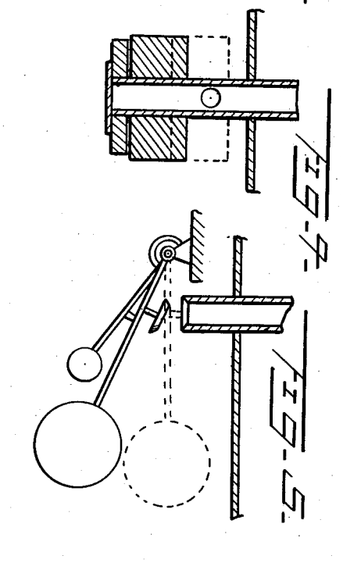

The layout of vent pipes as shown in Figure 1 results in pipes of considerable length and consequently with unfavorable pressure loss characteristics. In most cases, the large diameter pipes are to be run along the leading or trailing section of the wing, where the space is severely restricted due to the installation of wing de-icing or lift augmenting devices.

The layout of the vent system could be simplified considerably and the vent lines reduced to short straightforward pipes located away from engine exhausts (see Figure 2) if an anti-splash device could be developed which would prevent fuel from entering the vent pipe under any circumstances, while not interferring with flow of air or vapor through the pipe. The device must be so constructed as not to introduce into the vent system any additional hazard due to its method of operation, malfunctioning or failure.

The only mechanical device which can follow the rapid movements of fuel level in the tank is a float. Figures 3 through 7 illustrate different alternatives of float operated vent valves. All these alternatives possess some undesirable features. The alternatives shown in Figures 3 and 5 may cause over-pressurization of the tank if the valve closed accidentally during the climb of the aircraft and is kept in closed position by the pressure differential increasing with altitude between the air pressure in the tank and the surrounding atmosphere. A danger of over-pressurization and destruction of the tank exists in case of all valve alternatives specified above, except the valve on Figure 6, if due to defective equipment a leak develops between the tank and a fuel line under pressure. Even if the leak was small, the rising fuel level would cause the valve to close. The tank, deprived of venting facilities could be subjected to any pressure existing in the respective fuel line.

Figures 6, 7, 11, 12:
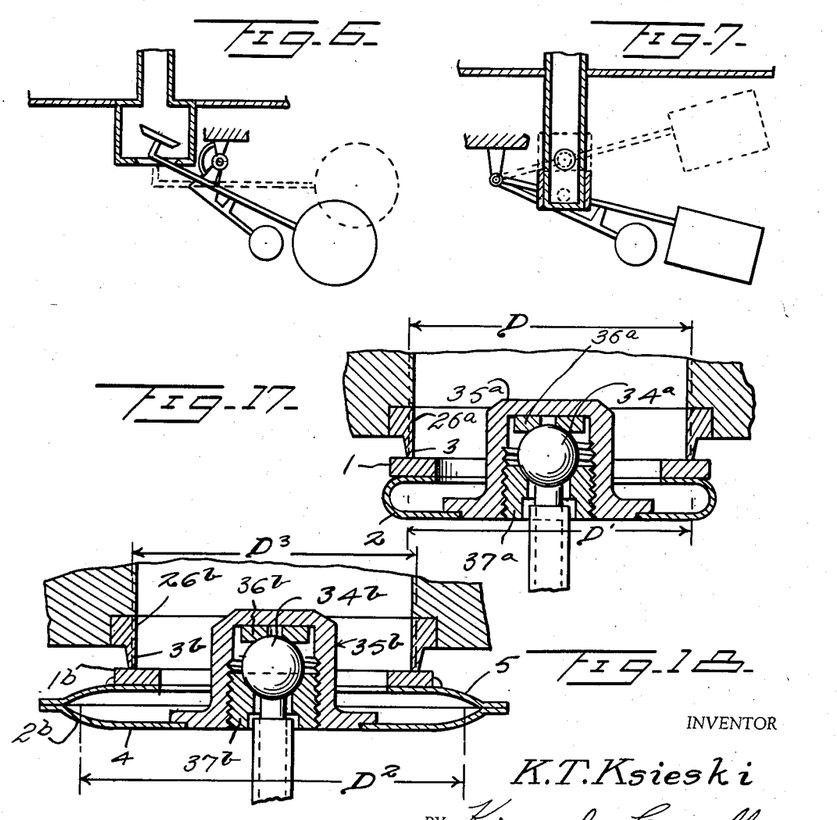
Figure 11 is a fragmentary sectional view showing the flapper or check valve embodied in Figures 8, 9 and 10.
Figure 12 shows diagrammatically a valve assembly constructed according to the preferred embodiment of this invention.
Figure 8:
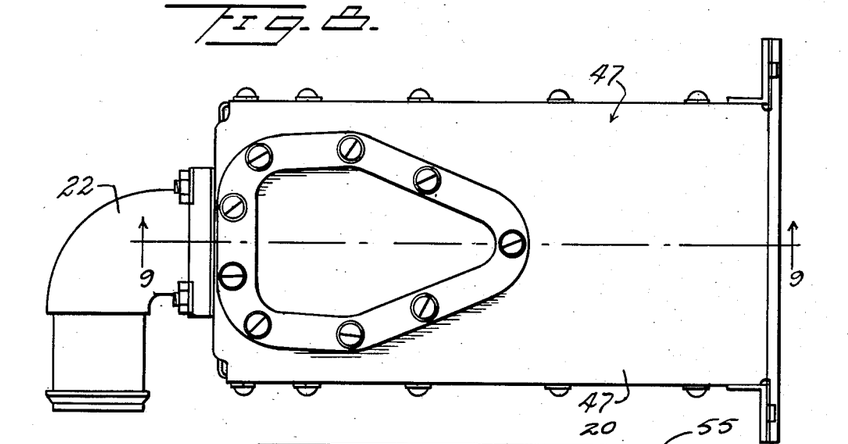
Figure 8 is a plan view of a valve assembly constructed to the preferred embodiment of this invention.

The valve shown in Figure 6 can be so designed that it would open if pressure in the tank exceeds the safe mark. The valve, however, would open under the pressure of fuel caused by the centrifugal force acting on fuel during certain aircraft maneuvers, unless a float of excessive volume or on a very long arm was provided.

Under negative "g" conditions or in the upside-down position of the aircraft, all float operated valves would open. In order to prevent fuel from entering the vent pipes, a gravity operated flapper valve would have to be incorporated into the vent system, or a device added to the vent valve which would oppose the forces resulting from the reversed buoyancy of the float. Such a device is shown on Figures 4 through 7. It consists of a suitable weight so intalled that it would not interfere with the action of the float under normal conditions, but would suppress the float and close the valve under negative "g" conditions.

The object of this invention is to provide a vent valve assembly which is free of shortcomings described above.

In the drawings:

Figure 17 is a sectional view of a modified form of poppet.

Figure 18 is a sectional view of another modified form of poppet.

The vent valve object of the invention is shown on Figures 8 through 11 inclusive. Numeral 20 designates a valve housing which is mounted usually in the aircraft tank and which communicates through the outlet port 21 with the vent pipe 22. The housing 20 is provided with a pair of air ports 23 and 24 and valve seats 25 and 26 are disposed in the ports 23 and 24 respectively. The valve mechanism consists of two valve poppets 27 and 28 adapted to engage on the seats 25 and 26 respectively. The poppets 27 and 28 are mounted on a rock member 29 in such a position that poppet 27 opens upwards while poppet 28 opens downwards. The rock member 29 is provided with a pair of upwardly projecting arms 30 (Figure 10) which rockably engage a horizontal shaft or pivot member 31 extending through the bottom wall 32 of the housing 20.

Figures 9, 11:
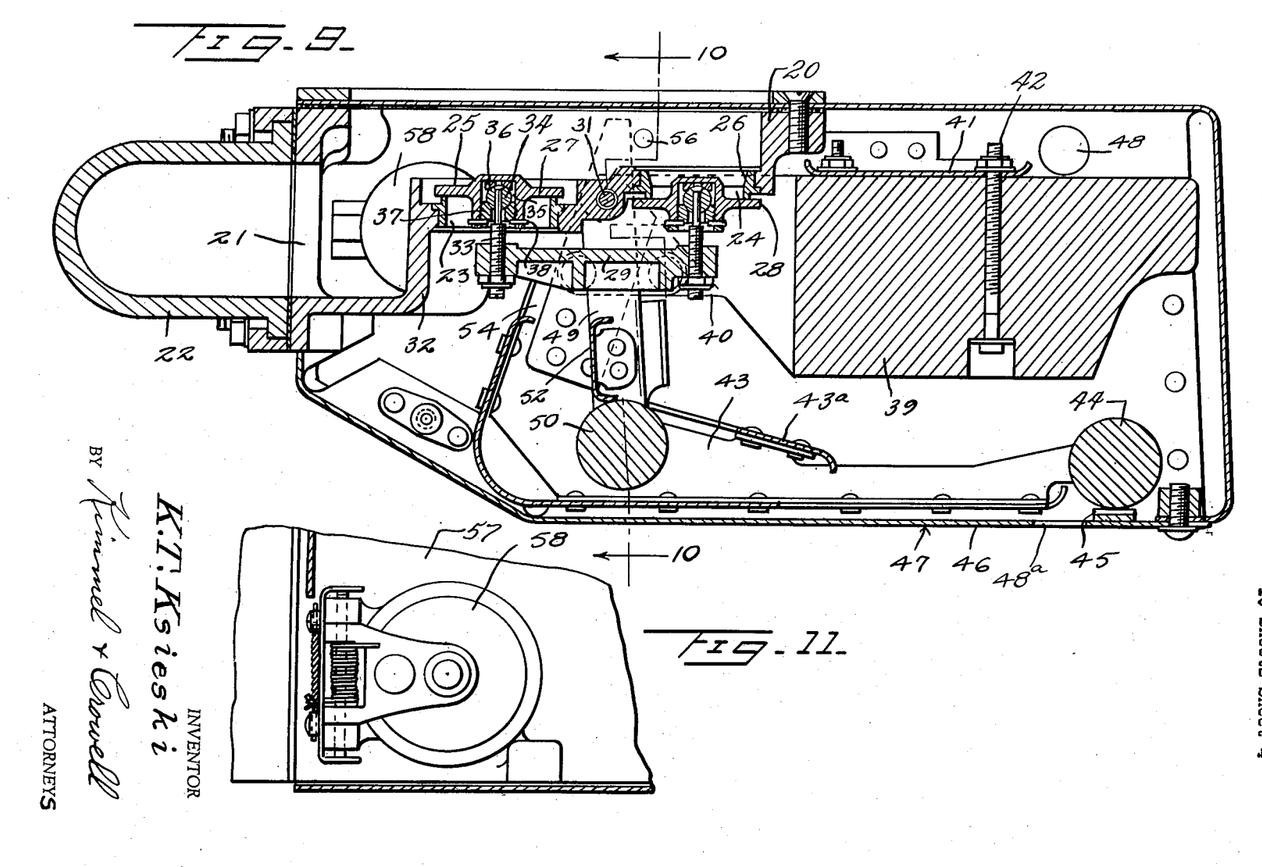
Figure 9 is a section taken on the line 9—9 of Figure 8.
Figure 10:
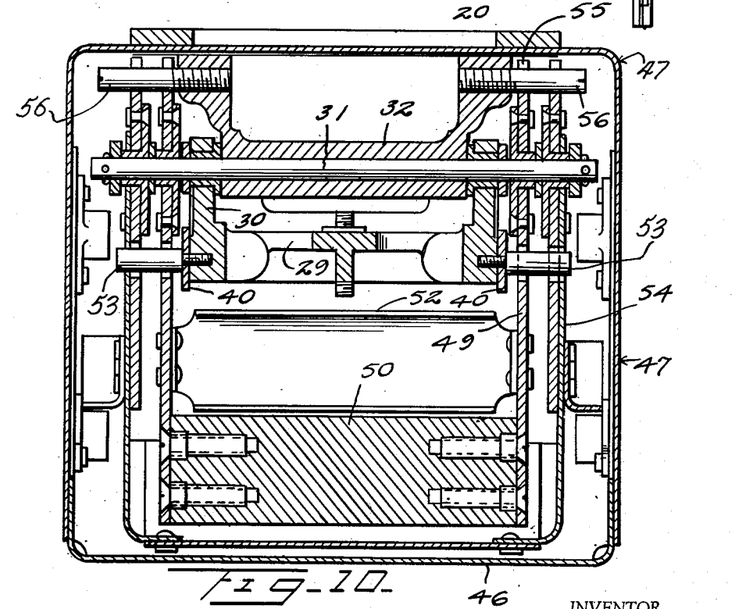
Figure 10 is the section taken on line 10—10 of Figure 9.

The poppets 27 and 28 are self seating and are connected to the rock member 29 by means of threaded pins 33 engaging through the rock member 29 and having a ball 34 at its upper end. Each valve poppet is provided with a socket 35 within which the ball member 34 engages, and a ball seat member 36 is disposed at the upper end of the socket 35. The socket 35 is threaded inside to receive the adjustable ball seat member 37, which is secured in position by means of a lock ring 38.

A float or buoyant member 39 is disposed forwardly of the housing 20 and connected with the rock member 29 by means of a pair of arms 40, which are fixed relative to the buoyant member 39 and project inwardly to engage on the opposite or outer sides of arms 30. The float or buoyant member 39 is fixed relative to the arms 40 by means of an upper plate 41 secured to the float or buoyant member 39 by fastening members 42.

A weight 50 protruding as far downwards as the boundary of the valve housing permits is mounted rockably on the pivot member or shaft 31 by means of levers 49. The levers are fixedly secured to each end of the oblong weight 50 and are stiffened additionally by means of a channel 52.

Another weight 44 is fixedly secured to a pair of L-shaped levers 43 which are rockably carried by the shaft or pivot member 31. The levers 43 extend outwardly beneath the float and are connected together at their outer ends by means of the said weight 44, and by a stiffening structure 43a. The rock member 29 is provided on each side thereof with an outwardly projecting pin 53 which is adapted to butt against the levers 49 and against the short arms 54 of L-shaped levers 43. The pins 53 limit the movement of the float or buoyant member 39 downward by contact of pins 53 with the inner edges of short arms 54 at the time weight 44 is contacting with rest 45 carried by bottom wall 46, and also permit the levers 49 or 43 to lift the float and close the valves when the said levers are rocked anti-clockwise under centrifugal force or in the inverted position of the aircraft.

Levers 49 are provided at their upper ends with upwardly projecting lugs 55 which are adapted in the approximately vertical position of levers 49 to engage outwardly projecting stop pins 56 which extend from the opposite sides of housing 20 and thus to limit the travel of levers 49 in the clockwise direction. The travel of levers 43 in the clockwise direction is limited by seat or rest 45 fixedly secured to bottom wall 46 of casing 47. Casing 47 encloses the valve housing 20 for which it provides a cover plate, protects the valve mechanism from splashes of fuel and constitutes a support by means of which the valve is mounted in the tank. The casing 47 is provided with openings 48 at the top and with openings 48a in bottom wall 46, so that air and fuel may freely enter or leave the interior of casing 47.

Housing 20 has mounted on one side wall 57 thereof a spring pressed check valve 58 opening into casing 47.

Figures 12, 13, 14:
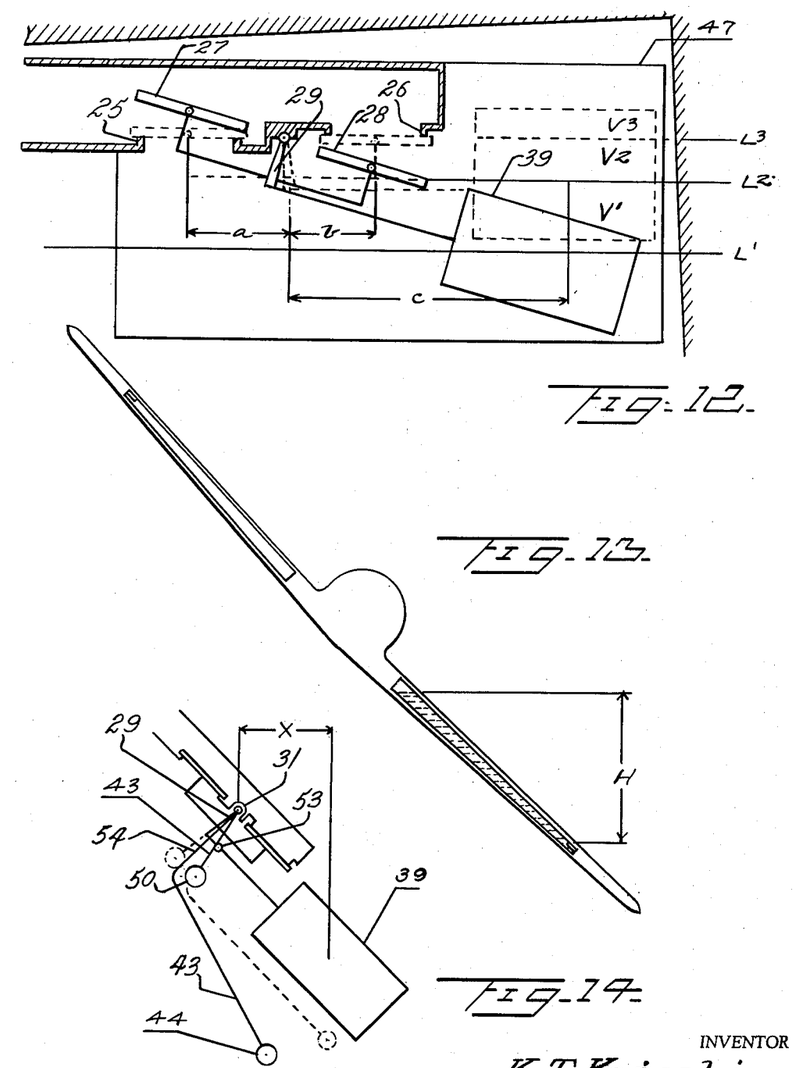
Figure 13 is a diagrammatic view of the tank incorporating the vent valve in the roll attitude of the aircraft.
Figure 14 is a diagrammatic view showing the geometry of the valve mechanism during the roll of the aircraft.

The vent valve herein disclosed is mounted in the forward upper outboard corner of the fuel tank or the group of interconnected tanks (Figure 2), at the inlet of the vent pipe 22, Figure 9, so that the vent pipe communicates with the tank through the housing 20 and air ports 23 and 24. Figure 12 and Figure 14 show diagrammatically the components of the vent valve necessary for the explanation of its operation and also indicate the position of the valve in the tank.

The tank is normally filled with fuel to the level $L_1$, Figure 12, so that the float 39 remains in its lowest position (shown in Figure 12 in full lines) and the poppets 27 and 28 are open. Thus in the horizontal position of the aircraft, in nose-up position and under a limited angle of nose-down position, the tank is freely vented at all attitudes of the aircraft.

When fuel is sloshing in the tank or moves towards its outboard end, while the aircraft rolls or due to the action of centrifugal force, the casing 47 fills with fuel and the float 39 is lifted. The float 39 is then in its upper position and the poppets 27 and 28 are closed when fuel in the casing 47 reaches the level $L_2$, Figure 12. The poppets 27 and 28 could be submerged, however, only if fuel in casing 47 had reached above the level $L_3$. When fuel moves from the level $L_2$ to $L_3$ an additional volume $V_2$ of float 39 normally emerging above the fuel level, is submersed. This creates an additional moment of buoyancy $V_2 c w$ ($w$ is the specific weight of fuel) which increases the pressure of poppets 27 and 28 against their respective seats 25 and 26. By means of threaded pins 33, Figure 9, the poppets have been so adjusted initially that both exert approximately the same pressure on their seats. With sufficient moment of additional buoyancy $V_2 w$, the outlet pressures of poppets can be kept so high that the valves would seal efficiently and prevent fuel from leaking into the vent pipe.

If the effective areas $A_1$ and $A_2$ (Figure 12) of poppets 27 and 28 are equal and the arms $a$ and $b$ of the rocker member 29 of the same length, the valves will be insensitive to pressure of fuel flooding the casing 47. The pressure which would tend to open the poppet 27 would hold the poppet 28 closed. The valves would remain closed as long as a positive moment $V_2 c w$ exists.

However, it is advantageous in some cases to provide the valves with an ability to crack open when the pressure of fuel flooding the valves reaches a certain height. This can be obtained by slightly unbalancing the valves, either by making the poppet 27 with a slightly larger effective area $A_1$ than the area $A_2$ of the poppet 28 or by making the arm $a$ of the rocker member 29 slightly longer than the arm $b$.

If $p$ is the pressure of fuel acting on poppets, the moment of unbalance will be $(A_1-A_2).a.p$ in case where $a=b$ or $A_1.(a-b).p$ in case where $A_1=A_2$.

As long as this moment is smaller than the moment $V_2 c w$, the valves will stay closed. However, at the instant when the pressure $p$ of the fuel reaches such a magnitude that the moment of unbalance exceeds the moment of buoyancy $V_2 c w$ the valves would crack open. By suitable selection of the moment of unbalance of poppets and of the moment of additional buoyancy it is possible to endow the valve assembly with an ability to crack open at any desired fuel pressure.

In case of a valve where the volume $V_2$ is fully submersed when fuel reaches the level $L_3$, the float will move from its upper to its lower position without increase of pressure differential across the valves, once the cracking pressure is reached. On the contrary in case of the float geometry as shown in Figure 12 less pressure differential will be required to hold the valves open in the lowest position, than in any of the intermediate positions. Consequently, once the cracking pressure is reached, the valves will open wide and flow large quantities of fuel at an almost steady pressure differential. However, by addition of a suitable float volume $V_3$ above the level $L_3$, it is possible to change this characteristic of the valve and obtain the ratio of pressure differential versus valve travel similar to that of a spring loaded valve.

When the aircraft, with wing tanks incorporating the vent valves discussed above, rolls while the wing tanks are filled, fuel rushes towards the outboard ends of tanks and floods the valves. In case of unbalanced poppets the increasing head of fuel H, Figure 13, assisted by the pressure due to centrifugal accelerations acting on fuel during the roll tend to open the valves. In case of balanced poppets there is no tendency of the valve to open but for the reasons which will be discussed later, the valves manifest an increased tendency to leak. On the other hand, the moment of float buoyancy $V_2cw$, Figure 14, holding the valves closed is reduced with the increased angle of roll.

When the angle of roll approaches 90°, the moment of float buoyancy becomes zero, and with further progress of roll, it becomes negative. If the poppets were controlled by the float alone, the valves would open. However, the change of aircraft attitude during the roll as well as the centrifugal accelerations cause the weights 50 and 44 to rotate with their respective levers around the shaft or pivot member 31 (anti-clockwise in Figure 14). First, the levers 49 and later the short arms 54 of L-shaped lever 43 butt against the pins 53 projecting from the rock member 29 and increase the pressure of poppets against their seats, counteracting the forces which tend to open the valves.

Weights 50 and 44 are so disposed with respect to the pivot member 31 that weight 50 is mainly responsive to centrifugal accelerations while weight 44 is mainly affected by gravity accelerations during aircarft maneuvers. Weight 50 is most effective around 90° of the roll. Its size is so selected that the closing moment exerted by it exceeds several times the maximum moment of fuel which tends to open the unbalanced poppets.

Weight 44 is so selected that in the upside-down position of the aircraft its closing moment is at least twice the moment of buoyancy of the float 39. Thus, in the upside-down position of the aircraft, weight 44 holds the float suppressed against its buoyancy and causes the poppets to exert at least as much pressure against their seats as they exert under the moment of float buoyancy in the normal attitude of the aircraft.

Figure 15:
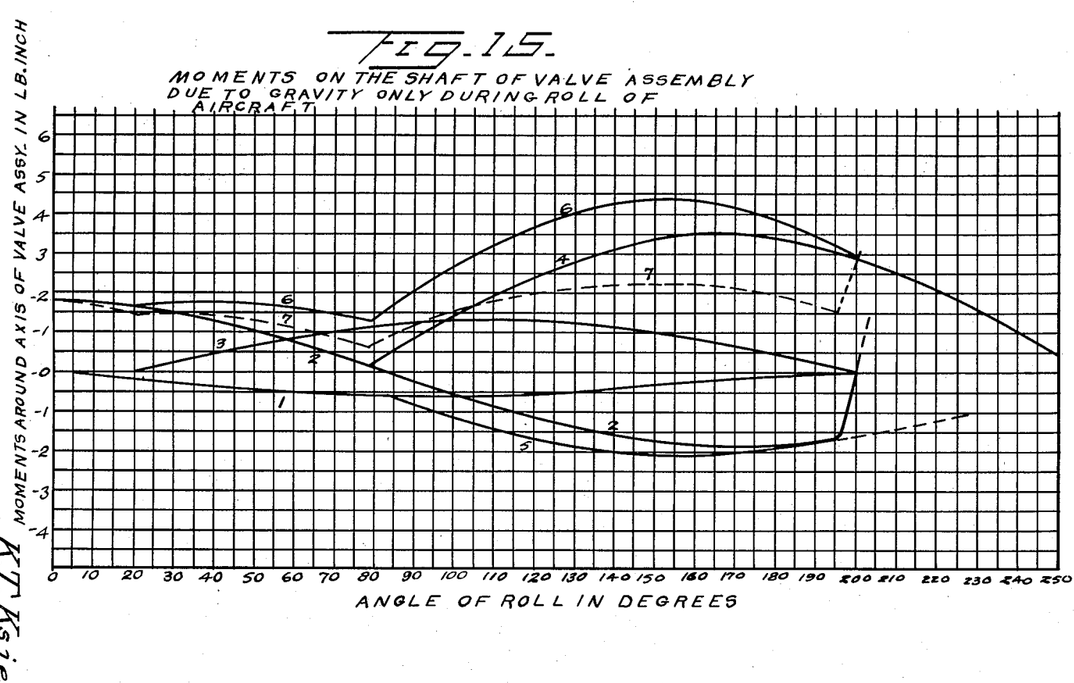
Figure 15 and Figure 16 show graphs representing the moments of forces appearing in the valve mechanism during the roll of the aircraft.
Figure 16:
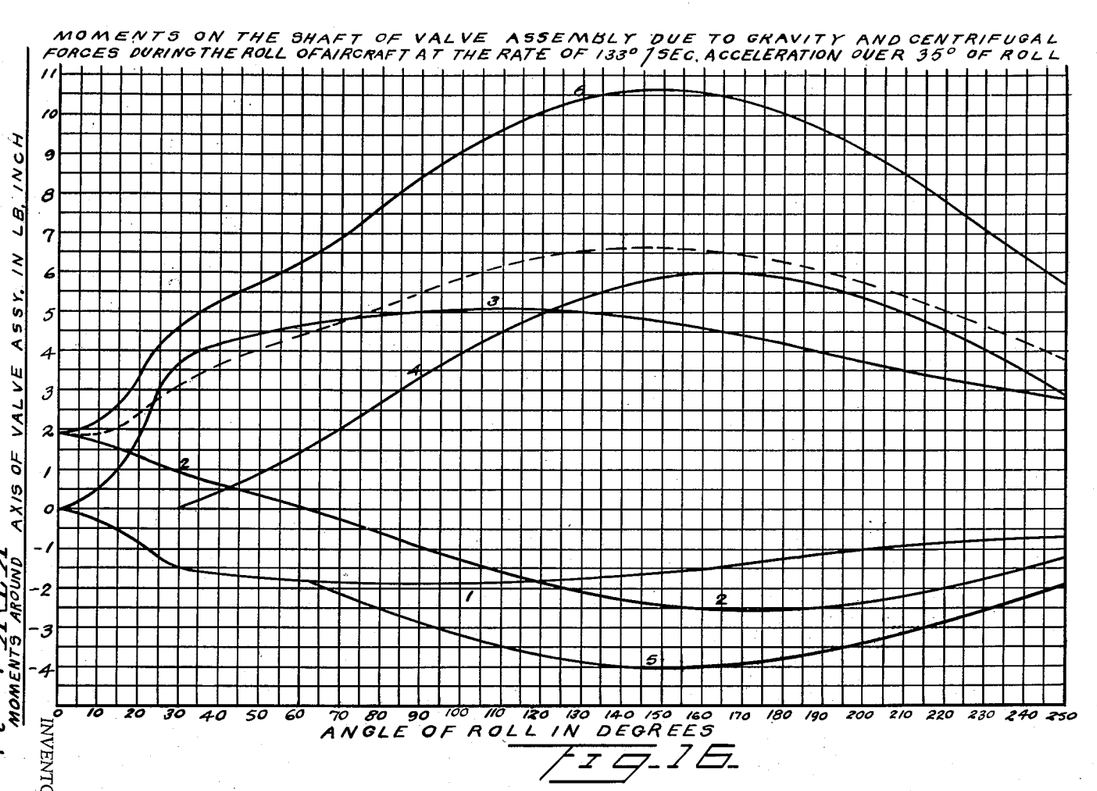

In order to illustrate the action of the float and weights on valve poppets during the maneuvers of aircraft and their mutual dependence, graphs, Figure 15 and Figure 16, are used. These graphs have been computed for a valve assembly with unbalanced poppets. They represent a case of an aircraft roll with full fuel in wing tanks. The graphs cover 250° of roll during which the wing tank under investigation sweeps through the lower half-circle of the roll and over 70° of the upper half-circle. During the remaining 110° of the roll not shown on the graphs, the loads tending to open the valve are much smaller than those occurring during the first 250° of roll. The abscissa in graphs Figure 15 and Figure 16 represent moments around the shaft or pivot member 31 controlling the operation of poppets. Positive moments are those which hold the valve closed, negative moments are those which tend to open it. The ordinates represent the angles of roll of the aircraft.

Graph Figure 15 represents a theoretical case of a roll in which the centrifugal forces have been disregarded. The conditions represented on this graph may occur in case of an incomplete roll and return at the moment of reversal, when the centrifugal forces temporarily become zero. The graph, Figure 15, covers also the flight in the upside-down position.

Curve 1 on graph Figure 15, represents the moment of fuel pressure due to gravity acting on poppets because of their unbalance. This moment tends to open the valves.

Curve 2 is the moment of buoyancy of the additional volume $V_2$ of the float. This moment is positive up to 83° of the roll, but becomes negative at higher angles of roll. At 200° this moment becomes positive again as fuel runs toward the inward end of the tank.

Curve 3 represents the moment due to the weight 50 under the gravity accelerations only.

Curve 4 represents a similar moment exerted by the weight 44.

Curve 5 represents the sum of negative moments tending to open the valve.

Curve 6 represents the sum of positive moments.

Curve 7 obtained by subtraction of curve 5 from curve 6 represents the resultant moments which hold the valves closed during the roll.

Graph Figure 16 represents the actual conditions of aircraft roll where the action of centrifugal forces is preponderant. The curves have been calculated for the rate of roll of 133° per second, this rate being reached after the first 35° of roll under a constant angular acceleration. The centrifugal forces increase from zero to full magnitude within this angle.

Curves 1 to 7 represent moments of the same elements as in case of the graph Figure 15 except that the moments are due here to gravity and centrifugal accelerations.

Graphs Figure 15 and Figure 16 represent only one type of aircraft maneuvers. The elements of the mechanisms controlling the action of poppets have been so selected however that the valves would remain closed when flooded under accelerations of any magnitude or direction which could occur during aircraft maneuvers. Since the vent valve is located near the forward outboard corner of the tank, it would be flooded and kept closed during the dive of the aircraft with fuel in wing tanks. In order to permit the flow of air into the tanks under the above conditions, the valve assembly is provided with a check valve 58 already described. The check valve is held closed by a light spring and opens toward the casing 47 under a low pressure differential.

Figure 17 represents an alternative design of poppet 28, Figure 9. The said poppet consists of a metal ring 1 fixedly secured to the socket 35a by means of a resilient member 2. Member 2 is welded or otherwise fixed to ring 1 and the socket 35a. A ball member 34a engages within the socket 35a, and a ball seat member 36a is disposed at the upper end of the socket. An adjustable or lower ball seat member 37a is disposed in the socket 35a. The ring 1 leans against the extended rim 3 of the seat 26a.

Figure 18 represents another alternative design of poppet 28. The poppet (Figure 18) consists of a metal ring fixedly secured to the socket 35b by means of a resilient member 2b. Member 2b is formed of complementary resilient members 4 and 5. A ball member 34b engages within the socket 35b, and a ball seat member 36b is disposed at upper end of socket 35b. Ring 1b bears against the extended rim 3b of the seat 26b.

In order to explain the functioning of the poppet Figure 17 or Figure 18 it has been assumed that the vent valve under consideration is fully balanced. The seats 25 and 26, Figure 19 and Figure 20, against which poppets 27 and 28 lean are of the same diameter and the arms $a$ and $b$ of the rocker member 29 are of the same length.

Figure 19:
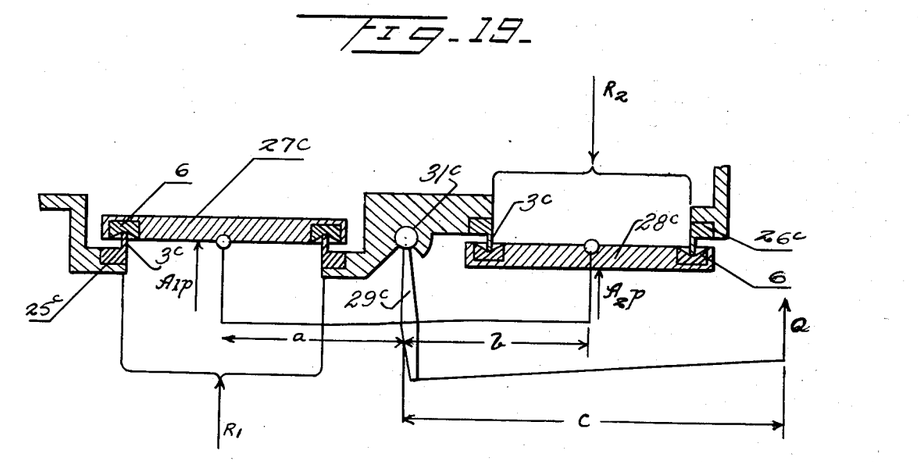
Figure 19 is a diagrammatic view showing the geometry of the valve mechanism and forces appearing in the mechanism in case of poppets with elastic inserts.

Figure 19 represents a schematic drawing of such a valve in which poppets 27c are provided with rubber inserts 6 to improve the sealing of the valve.

Let us assume that:

$Q_c$ is the closing moment produced by the float buoyancy and the moments of weights 50 and 44 under the action of gravity and centrifugal accelerations existing under some assumed opertational conditions.

$R_1a$ is the moment of the pressure exerted by the rim 3c of the seat 25c on the poppet 27c and $R_2b$ is the moment of the pressure exerted by the rim 3c of the seat 26c on the poppet 28b. $R_1$ and $R_2$ are the reactions to the force Q.

If no pressure differential exists across the valves the conditions of equilibrium of moments around the pivot member 31c require that $$R_1a + R_2b = Qc$$

By means of threaded pins 33, the pressure on both poppets can be equalized so that initially $$R_1 = R_2$$

Under the pressure exerted by reactions $R_1$ and $R_2$, the rubber inserts 6 of poppets 27c and 28c deflect. At the same time arms a and b of the rock member 29c bend slightly as shown in Figure 19.

If the valve is flooded with fuel under pressure $p$ the forces $A_1p$ and $A_2p$ are applied on poppets 27c and 28c pushing them upwards. The force $A_1p$ acting in the same direction as the reaction $R_1$ tends to bend the arm a further, thus moving slightly the poppet 27c up and reducing the deflection of the rubber insert. The force $A_2p$ acting against reaction $R_2$ tends to reduce the bending of the arm b and in some cases to bend it in the opposite direction, thus moving the poppet 28c upwards and increasing the deflection of its rubber insert. Since the deflection of arms a and b is usually small in comparison with the deflection of rubber inserts the reduction of the rim pressure on the poppet 27c would not cause the valve to leak provided that the deflection of the rubber insert 6 of the said poppet due to the moment $Q_c$ is sufficiently high.

Figure 20:
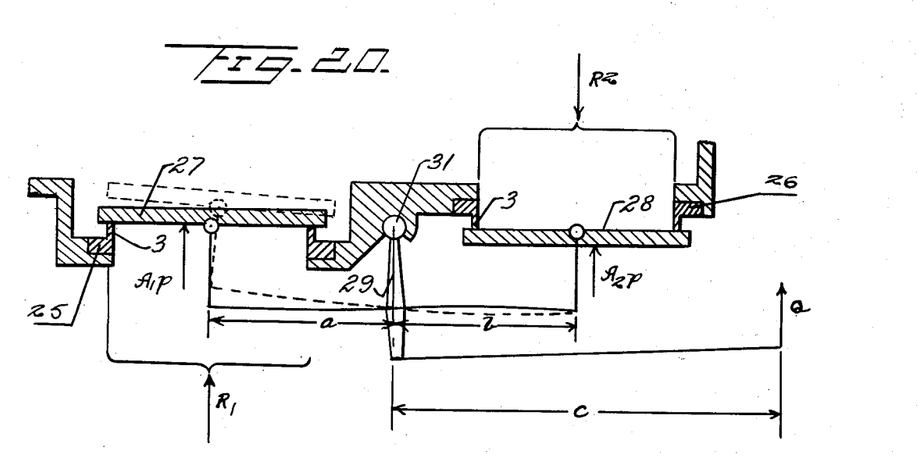
Figure 20 is a diagrammatic view showing the geometry of the valve mechanism and forces appearing in the mechanism in case of all metal poppets.

If the valve is provided with all-metal poppets similar as shown on Figure 9, the force $A_2p$ would press the poppet 28 against the seat 26 increasing the rim pressure but cannot cause any movement of the poppet (see Figure 20). The force $A_1p$ would gradually substitute for the reaction $R_1$ reducing the rim pressure on the poppet 27. As soon as the force $A_1p$ reached the magnitude of the reaction $R_1$ the rim pressure on the poppet 27 would be reduced to zero and poppet 27 would float on the seat. At this point the valve would begin to leak. With further increase of the force $A_1p$ the poppet 27 would be lifted from its seat. Since the rock member 29 can rotate around the pivot member 31 the travel of the poppet 27 due to the load $A_1p$ would be equal to the sum of deflections of the arm a and arm b of the rock member 29 under the said load.

The travel of the poppet 27 under the load caused by fuel pressure can be prevented by substitution of the conventional rigid all-metal poppet 28 with a poppet shown on Figure 17 or Figure 18 so designed that the deflection of the elastic members 2 or 2b under the load $A_2p$ would be equal to the sum of deflections of arms a and b of the rock member 29 under the load $A_1p$. In this case, however, the rim pressure on the poppet 27 would be still $R_1 - A_1p$ while the rim pressure on the poppet 28 would be $R_2 + A_2p$. In order to improve the distribution of rim pressures between the poppets 27 and 28 the flexibility of the elastic members 2 or 2b shall be such that at the deflection of this member equal to the sum of deflection of the arms a and b under the load $A_1p$, a fraction only of the load $A_2p$ would be transmitted from the face of the poppet, Figures 17 and 18, to the ring 1 or 1b. In such a case, further deflection of the elastic members 2 or 2b would be halted by the poppet 27 butting against the seat 25. The load $A_2p$ will be balanced partially by the reaction of the seat 26 and partially by the reaction of the seat 25.

The effective diameter $D_1$ of the poppet, Figure 17, is the same as the mean diameter D of the rim 3 of the seat 26a. The effective diameter $D_2$ of the poppet, Figure 18, is larger than the mean diameter $D_3$ of the rim 3b of the seat 26b. This changes the deflection characteristics of the poppets.

Let us assume that the rigidity of elastic members 2 or 2b of both poppets were so chosen that the curves of deflection versus load were identical for both poppets in case the poppets were subjected to identical loads applied through the threaded pins 33. Due to a larger effective diameter of the elastic member 2b, the slope of the deflection curve of the poppet, Figure 18, would be steeper than the slope of the deflection curve of the poppet, Figure 17, if both poppets were subjected to identical increase of fuel pressure. This may prove advantageous in an attempt to equalization of rim pressures on poppets 27 and the modified poppet 28 under widely variable fuel pressures.

Figure 21:
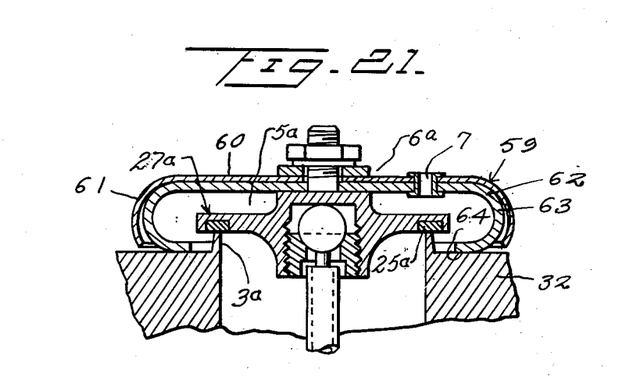
Figure 21 is a fragmentary vertical section of a modified form of poppet.

Referring to Figure 21 there is disclosed a modified form of valve poppet structure wherein the poppet 27a is encompassed by a cap member 59 which is formed of a top plate 60 and an annular arcuate margin 61. A yieldable valve gasket 62 engages the inner side of the cap 59 and is formed with a down-turned and inwardly directed margin or flange 63, which is adapted in the closed position of the poppet 27a to rest against the upper side 64 of the bottom wall 32 of housing 20. The chamber 5a enclosed between the poppet 27a and the gasket 62 communicates with the interior 6a of the housing 20 by means of a small nozzle 7.

As long as the poppet 27a is closed, the pressure in chamber 5a remains the same as the pressure in the interior of the housing 20. The balance of the valve assembly is controlled by the mean diameter of the rim 3a of the poppet seat 25a. If the tank is flooded and the pressure of fuel reaches the cracking pressure of the valve assembly the poppet 27a opens slightly and fuel under pressure fills the chamber 5a. Since the expanding gasket 62 is still resting on the face 64, fuel from chamber 5a can escape only through the nozzle 7. With the increasing amount of fuel leaking through the poppet 27a, the pressure in the chamber 5a rises. Since the diameter on which the gasket 62 engages the upper side 64 of the bottom wall 32 of the housing 20 is larger than the mean diameter 3a of the rim of the seat 25a the valve assembly becomes considerably unbalanced. The valve snaps open faster and wider than in case of valve provided with a conventional poppet 27.

In the open position of the poppet 27a, the gasket 62 becomes disengaged from the bottom wall 32. However, since the pressure loss across the port 23 depends still on the diameter of the gasket 62, the effect of additional unbalance persists. The valve assembly will remain open under lower pressure differential than the cracking pressure as long as a substantial flow of fuel exists.

Figures 22, 23:
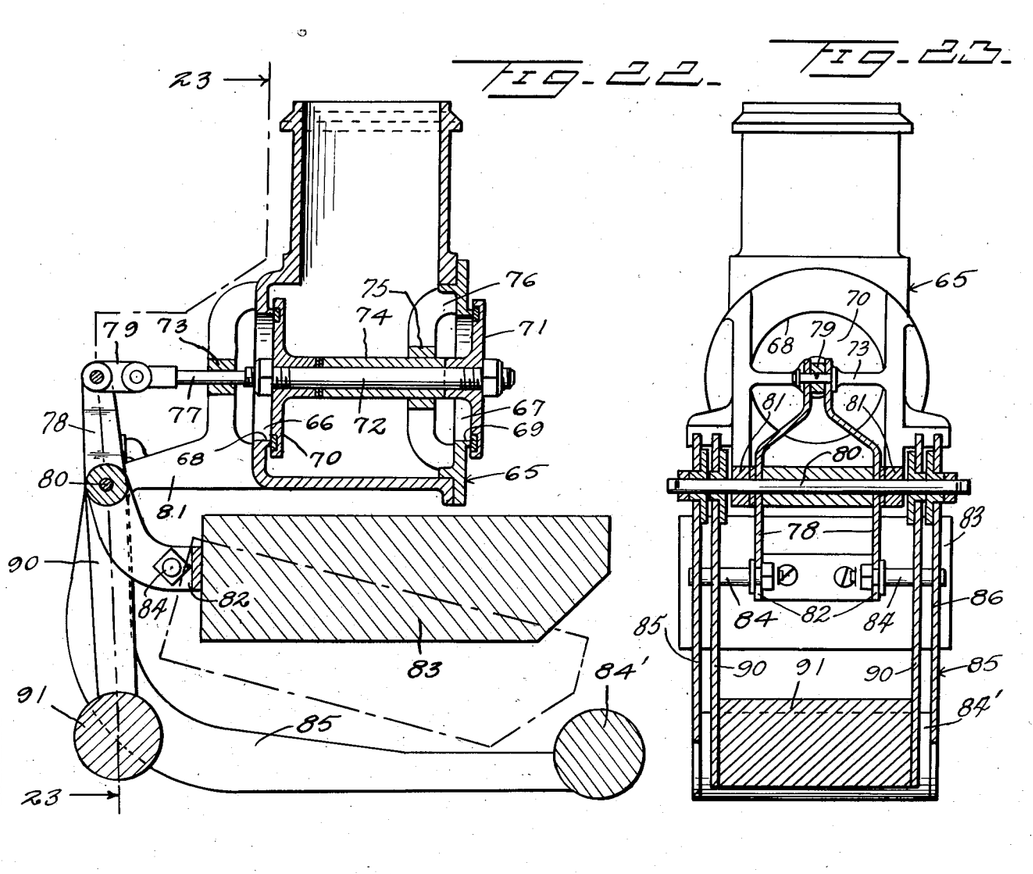
Figure 22 is a vertical section of a modified form of vent valve assembly.
Figure 23 is a sectional view taken on line 23—23 of Figure 22.

Referring now to Figures 22 and 23, there is disclosed a modified form of this invention embodying a valve housing 65 which is formed with ports 66 and 67 which are disposed in axial alignment. A valve seat 68 is formed at the inner end of port 66 and a valve seat 69 is formed at the outer end of port 67. A valve plug or poppet 70 is adapted to engage seat 68 and a second valve plug 71 is adapted to engage seat 69. The valve plugs 70 and 71 are mounted on a horizontally disposed shaft 72 which is slidable through a guide 73 carried by the housing 65.

A sleeve 74 engages about shaft 72 within housing 65 and is slidable through a guide 75 carried by spider arms 76. Shaft 72 is formed with a reduced outer end 77 which is connected to a double arm lever means 78 by means of a link 79. The levers 78 are mounted on a pivot pin or shaft 80 which is supported from a pair of arms 81 extending from the lower portion of housing 65. Lever arms 78 are provided at their lower ends with forwardly projecting extensions 82 which are secured to a float member 83. The extensions 82 have secured thereto outwardly projecting pins 84. Valve members 70 and 71 are adapted to be moved to a closed position when the housing 65 is inverted by means of a gravity actuated member 84' constructed in the form of a weight, which has secured thereto, a pair of L-shaped lever members 85.

The lever members 85 are formed with upwardly projecting short arms 86 which rockably engage the pivot member 80. Valve members 70 and 71 are adapted to be moved to a closed position by centrifugal force under the action of a pair of pivoted levers 90 which are rockably mounted on the pivot member or shaft 80, and which have secured to their lower ends, a weight 91.

Levers 90, upon rocking to the right or counterclockwise under centrifugal force, are adapted to engage the pins 84 so as to rock levers 78 to the left or to a valve plug closing position.

Figure 24:
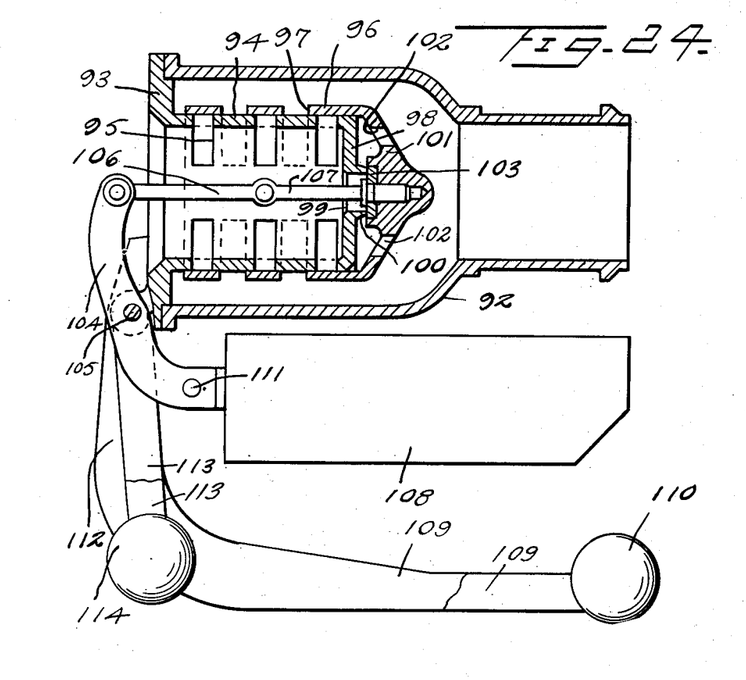
Figure 24 is a vertical section showing another form of vent valve assembly.

Referring now to Figure 24, there is disclosed a substantially cylindrical housing 92 which has secured to one end thereof, a plate 93 and a cylindrical member 94 extends inwardly of housing 92 and is formed integral with plate 93. Cylindrical member 94 forms a stationary valve means and is provided with a plurality of spaced openings 95. A cylindrical valve plug 96 having openings 97, slidably engages about cylindrical member 94 and air is vented into or from housing 92 at the time valve plug 96 is moved inwardly to effect registry of slots 97 with slots 95 of inner member 94. The inner end of cylindrical member 94 is formed with a head 98 having a central opening 99 which is defined by a valve seat 100. Valve plug 96 is formed with an inner tapered head 101 having one or more openings 102 therethrough and head 101 has secured to the inner side thereof, a valve gasket 103 engaging against valve seat 100 at the time valve plug 96 is moved to a closed position.

A rock lever means 104 is rockably carried by plate 93 on a pivot 105 and the upper or inner end of the lever means 104 is connected to valve head 101 by means of a linkage 106 and 107. The lower ends of the levers 104 have secured thereto, a float member 108.

A gravity actuated L-shaped lever means 109 is rockably mounted on the pivot member 105 and includes a weight 110 disposed at the outer end of the lever means 109. The lower portions of levers 104 have extending outwardly or laterally therefrom, pins 111 which are adapted to be engaged by the short arms 112 of the L-shaped levers 109. A pair of centrifugal actuated levers 113 are rockably mounted on the pivot 105 and the two levers 113 are connected together by means of a weight 114.

The valve assembly disclosed on Figure 22 and Figure 23 can be made insensitive to fuel pressure or can incorporate a provision to crack open at a predetermined fuel pressure. In the first case, the diameters of the seats 68 and 69 are equal. In the second case, the diameter of the seat 68 is larger than the diameter of the seat 69.

The valve assemblies disclosed on Figure 24 and Figure 25 are unbalanced by incorporation of small relief valves consisting of the seat 100 and the valve gasket 103. The valve assembly opens when the moment of unbalance caused by fuel pressure acting on the gasket 103 exceeds the closing moment produced by the buoyancy of the additional volume of float 108 which normally emerges from fuel but which would be submerged when the valve assembly is flooded.

What is claimed is:

1. A vent valve for the fuel tank of an aircraft comprising a valve housing having a pair of inlet ports, a pair of oppositely facing valve seats in said ports, a rock member, pivot means carried by said housing supporting said rock member, a pair of oppositely facing valve plugs carried by said rock member, a float fixed to and projecting from said rock member, a casing about said housing and float, gravity actuated means pivotally carried by said pivot means on said housing, centrifugally actuated means pivotally carried by said pivot means on said housing, and means projecting from said rock member disposed in the path of movement of each of said gravity and said centrifugally actuated means, whereby on movement of either of said gravity and said centrifugally actuated means said rock member is moved to valve closing position.

2. A vent valve for the fuel tank of an aircraft comprising a valve housing having an air intake and a pair of ports, a valve plug for each port, float means connected with said plugs for moving said plugs to open and closed positions, gravity actuated vertically movable means carried by said housing operable upon inverting of said housing to close said valves and hold said valves in closed position, and horizontally movable means carried by said housing active under centrifugal force for closing said valves and holding said valves in closed position.

3. A vent valve for the fluid tank of an aircraft or a flying missile comprising a valve housing having an outlet, a pair of inlet ports provided with oppositely facing valve seats of equal area, located at equal distances from a shaft fixedly attached to the said housing, a rock member pivotally mounted on the said shaft, a pair of oppositely facing valve plugs carried by said rock member adapted to close said ports, a float fixed to and projecting from said rock member for moving said plugs to open or closed position according to the level of fluid in said tank, gravity actuated means pivotally carried by said shaft on said housing operable under negative gravity conditions and upon inverting of said housing for engaging said rock member and holding said plugs in closed position, means pivotally carried by said shaft on said housing active under centrifugal force, for engaging said rock member and holding said plugs in closed position, and means projecting from said rock member disposed in path of the swinging of said gravity actuated means and said centrifugally actuated means for engagement thereby.

4. A vent valve for the fluid tank of an aircraft or a flying missile comprising a valve housing having an outlet, a pair of inlet ports provided with oppositely facing valve seats, one of said seats facing outwardly from said tank, the other of said seats facing the interior of said tank, a shaft attached to said housing, said seat facing outwardly from said tank being of a larger diameter than said seat facing the interior of said tank, a rock member mounted on said shaft, a pair of oppositely facing valve plugs carried by said rock member adapted to close said ports, a float fixed to and projecting from said rock member, having a weight and volume such that it rocks the rock member and moves said plugs to closed position when partially submersed in fluid, while utilizing the buoyancy of the additional volume to create a force of determined magnitude opposing the opening of pressure unbalanced plugs upon overflooding the tank with fluid under pressure, gravity actuated means pivotally carried by said housing, operable under negative gravity conditions and upon inverting of said housing for holding said plugs in closed position, means pivotally carried by said housing active under centrifugal force for holding said valves in closed position, and means projecting from said rock member disposed in the path of the swinging of said gravity and centrifugally actuated means for engagement thereby for rocking said rock member to a valve closing position.

References Cited in the file of this patent

UNITED STATES PATENTS

| | | |
|---|---|---|
| 1,119,979 | Mulligan | Dec. 8, 1914 |
| 2,158,753 | Hansen | May 16, 1939 |
| 2,194,348 | Zoder | Mar. 19, 1940 |
| 2,510,098 | Geisler | June 6, 1950 |
| 2,570,557 | Johnson | Oct. 9, 1951 |
| 2,615,461 | Crow | Oct. 28, 1952 |

FOREIGN PATENTS

| | | |
|---|---|---|
| 466,335 | Great Britain | May 26, 1937 |